United States Patent [19]

Clough

[11] Patent Number: 5,279,802

[45] Date of Patent: Jan. 18, 1994

[54] PRECIOUS METAL RECOVERY PROCESS FROM SULFIDE ORES

[75] Inventor: Thomas J. Clough, Santa Monica, Calif.

[73] Assignee: Ensci, Inc., Santa Monica, Calif.

[21] Appl. No.: 935,577

[22] Filed: Aug. 26, 1992

Related U.S. Application Data

[63] Continuation-in-part of Ser. No. 751,793, Aug. 29, 1991, abandoned, and Ser. No. 749,427, Aug. 23, 1991, abandoned, which is a continuation-in-part of Ser. No. 358,685, May 30, 1989, abandoned, which is a continuation of Ser. No. 213,884, Jun. 30, 1988, abandoned, which is a continuation-in-part of Ser. No. 5,140, Jan. 20, 1987, Pat. No. 4,765,827, and Ser. No. 25,069, Mar. 12, 1987, Pat. No. 4,801,329, said Ser. No. 751,793, is a continuation-in-part of Ser. No. 627,896, Dec. 13, 1990, abandoned, which is a continuation of Ser. No. 213,884, Jun. 30, 1988.

[51] Int. Cl.$^5$ .................... C01G 55/00; C01G 5/00; C01G 7/00; C22B 11/00

[52] U.S. Cl. ........................................ 423/22; 423/27; 423/29; 423/30; 423/31; 423/41; 75/744

[58] Field of Search ............... 423/22, 27, 29, 30, 423/31, 41, 49, 52, DIG. 4, 75/744

[56] References Cited

U.S. PATENT DOCUMENTS

| | | | |
|---|---|---|---|
| 3,988,416 | 10/1976 | Barner et al. | 423/33 |
| 3,990,891 | 11/1976 | Sandberg et al. | 423/35 |
| 4,167,564 | 9/1979 | Jensen | 424/177 |
| 4,189,462 | 2/1980 | Thompson | 423/226 |
| 4,237,242 | 12/1980 | Frankel | 525/119 |
| 4,283,379 | 8/1981 | Fenton et al. | 423/571 |
| 4,325,936 | 4/1982 | Gowdy et al. | 423/226 |
| 4,421,724 | 12/1983 | Hunnel | 423/29 |
| 4,436,714 | 3/1984 | Olson | 423/224 |
| 4,485,082 | 11/1984 | Blytas | 423/226 |
| 4,545,816 | 10/1985 | Rappas | 423/24 |
| 4,552,589 | 11/1985 | Mason et al. | 423/29 |
| 4,628,077 | 12/1986 | Desmond et al. | 526/90 |
| 4,645,650 | 2/1987 | Fray et al. | 423/49 |
| 4,740,243 | 4/1988 | Krebs et al. | 423/27 |
| 4,752,332 | 6/1988 | Wu et al. | 423/27 |
| 4,765,827 | 8/1988 | Clough et al. | 423/29 |
| 4,801,329 | 1/1989 | Clough et al. | 423/29 |
| 4,830,716 | 5/1989 | Ashmead | 204/72 |
| 4,846,274 | 7/1989 | Clough | 166/270 |

FOREIGN PATENT DOCUMENTS 0177295 9/1986 European Pat. Off. .

OTHER PUBLICATIONS

"An Examination of the Sorption Properties of Carbonaceous Substances During the Cyanidation of Gold Ores," Zaitseva et al. Tsvetnye Metally/Non-Ferrous Metals, pp. 78-80, no date.

Grant & Hackh's Chemical Dictionary, 5th ed., 1987, p. 48.

"Carbonaceous Matter in Gold Ores: Isolation, Characterization and Absorption Behavior in Aurocyanide Solutions," Osseo-Asare et al. pp. 125-145, no date.

"Recovery of Gold and Silver from Ores by Hydrometallurgical Processing," Eisele et al. Separation Science and Technology 18(12&13), pp. 1081-1094, 1983.

"How Carlin treats gold ores by double oxidation," Guay. World Mining, Mar. 1980, pp. 47-49. USA.

"Gold recovery from a refractory carbonaceous gold ore," Raecevic et al. Canadian Mining Journal, Mar., 1976, pp. 40-45. Canada.

"Processing Refractory Carbonaceous Ores for Gold Recovery," Scheiner et al. Journal of Metals, Mar. 1971, pp. 37-40. USA.

Inorganic Chemistry, Sharpe, A. G., 1981, p. 581.

Hackh's Chemical Dictionary, p. 57 (Fourth Edition), 1973.

Primary Examiner—Michael Lewis
Assistant Examiner—Steven Bos
Attorney, Agent, or Firm—Frank J. Uxa, Jr.

[57] ABSTRACT

A process for recovering at least one precious metal from an ore containing carbonaceous material is disclosed. The process involves the use of promoting amounts of certain metal redox couples and/or metal components, in particular, certain metal complexes with ligands.

Preferred metal compositions comprise at least one of (1) redox cyclable vanadium (5+) ligand complex, (2) redox cyclable iron (3+) ligand complex, and (3) redox cyclable manganese (3+) ligand complex. In the process, the use of at least one regenerable component capable of maintaining the complexed metal in the desired oxidation state provides for integrated process synergy.

19 Claims, No Drawings

PRECIOUS METAL RECOVERY PROCESS FROM SULFIDE ORES

RELATED APPLICATIONS

This application is a continuation-in-part of copending application Ser. No. 751,793 filed Aug. 29, 1991 abandoned and copending application Ser. No. 749,427 filed Aug. 23, 1991 abandoned which applications are a continuation-in-part of application Ser. No. 627,896 filed Dec. 13, 1990 now abandoned and application Ser. No. 358,685 filed May 30, 1989 now abandoned, respectively which applications are a continuation of application Ser. No. 213,884 filed Jun 30, 1988 now abandoned which application is a continuation-in-part of application Ser. No. 005,140 filed Jan. 20, 1987, now U.S. Pat. No. 4,765,827 and application Ser. No. 025,069, filed Mar. 12, 1987, now U.S. Pat. No. 4,801,329. Each of these applications and patents are hereby incorporated in their entirety herein by reference.

BACKGROUND OF THE INVENTION

This invention relates to a process for recovering at least one metal, e.g., gold, silver, the platinum group metals and the like, from an ore containing reducible manganese and the metal. The invention also relates to a process for recovering at least one metal, e.g., as noted above, from an ore containing metal sulfides and the metal to be recovered. In particular, the invention relates to a process which involves processing a metal-containing ore so as to facilitate the recovery of the metal from the ore.

Reducible manganese-containing ores quite often contain metal values which are difficult to recover because of the "locking" nature of the manganese in the ore. For example, the occurrence of manganese-locked silver ores has long been a problem for ore processors. Conventional smelting can treat small, limited quantities of manganese-locked silver ores when processing conventional ores. The manganese must be properly slagged to prevent attack of the crucibles. This consumes silica, increases energy required, and contributes to metal loss in the slag. Manganese-locked silver ores may be leached with sodium cyanide to recover silver, but such recovery is often limited by the manganese content. Manganese in such ores "locks" the silver in the ore by, for example, blocking access by the sodium cyanide solution to the silver-bearing or silver minerals.

Metal sulfide-containing ores often contain metal values, such as gold, silver, the platinum group metals and the like, which are difficult to recover because of the "locking" nature of the metal sulfide in the ore. For example, the occurrence of insoluble metal sulfide-locked gold ores has long been a problem for ore processors. In addition, electrum-containing ores are also difficult to process for the recovery of precious metal values.

Use of sodium cyanide to remove silver from manganese-locked silver ores or to remove gold from such gold metal sulfide-containing ores is usually uneconomical. Moreover, stringent air pollution control regulations and low metal prices have forced smelters to shut down or select ores from which metal values can be recovered relatively easily. Ores which include "locking" manganese (e.g., containing about 0.5% to about 35% by weight of manganese) are often considered marginal and may not be processed.

Commonly assigned U.S. patent applications Ser. Nos. 858,056 now U.S. Pat. No. 4,752,332 and 858,369, now U.S. Pat. No. 4,740,243 filed Apr. 30, 1986, disclose processes for the recovery of various metal values, e.g., silver, gold, and the platinum group metals, involving the use of reducible manganese components. These applications also include a more detailed discussion of certain prior art references. Also, commonly assigned U.S. patent application Ser. No. 931246, filed Nov. 17, 1986, discloses a process to reduce the sulfur content of coal and petroleum. All of these applications are incorporated in their entireties by reference herein. There continues to be a need for improved processing to recover metal values, in particular from reducible manganese-containing ores and metal sulfide ores.

SUMMARY OF THE INVENTION

A process for recovering at least one metal other than manganese from an ore containing the metal and reducible manganese, e.g., manganese generally in the plus three (+3) or four (+4) oxidation state, and/or for recovering at least one metal from an ore containing the metal and at least one of certain sulfides of a metal has been discovered.

In one broad aspect, the process involves: contacting an ore containing the metal to be recovered and reducible manganese with an aqueous composition and a material, e.g., a metallurgical material, ore and the like, containing at least one metal sulfide in the presence of a metal redox couple more positive than about +0.1 versus the standard hydrogen electrode (W. M. Latimer convention) at conditions effective to (1) chemically reduce at least a portion of the manganese, (2) oxidize at least a portion of the metal from the metal sulfide and/or the sulfide from the metal sulfide, and (3) at least partially liberate the metal to be recovered from the ore; and recovering the metal from the ore. In another broad aspect, the present process involves: contacting an ore containing at least one metal to be recovered and at least one sulfide of a metal with an aqueous composition and at least one reducible manganese-containing material, e.g., a metallurgical material, ore and the like, in the presence of a metal redox couple more positive than about +0.1 versus the standard hydrogen electrode (W. M. Latimer convention) at conditions effective to (1) chemically reduce at least a portion of the manganese, (2) oxidize at least a portion of the metal from the metal sulfide and/or the sulfide from the metal sulfide, and (3) at least partially liberate the metal to be recovered from the ore; and recovering the metal from the ore. Preferably, the above-noted contacting is conducted in the presence of a metal redox couple more positive than about +0.5 versus the standard hydrogen electrode (W. M. Latimer convention).

In one embodiment, the contacting occurs in the presence of an additional oxidant, more preferably a gaseous source of oxygen, e.g., air, enriched/diluted air, oxygen and the like.

In one embodiment, the redox couple or added metal component is preferably selected from at least one of the following: (A) at least one iron component, preferably an iron complexing agent, in which iron is present in an amount in the 3+ oxidation state effective to promote the oxidation of the metal from the metal sulfide and/or the sulfide from the metal sulfide ; (B) at least one vanadium component in which vanadium is present in an amount in the 5+ oxidation state effective to promote the oxidation of the metal from the metal sulfide and/or the sulfide from the metal sulfide ; (C) at least one copper component in which copper is present in an amount in the 2+ oxidation state effective to promote oxidation of the metal from the metal sulfide and/or the sulfide from the metal sulfide ; (D) at least one cobalt component in which cobalt is present in an amount in the 2+ oxidation state effective to at least promote the oxidation of the metal from the metal sulfide and/or the sulfide from the metal sulfide; (E) at least one manganese component in which manganese is present in an amount in the 3+ and/or 4+ oxidation state effective to at least promote the oxidation of the metal from the metal sulfide and/or the sulfide from the metal sulfide; and mixtures thereof. The ore or ores preferably contain precious metals, such as gold, silver, the platinum group metals and the like, which can be recovered using the process of this invention. The various embodiments of this invention can be practiced singly or in any combination of embodiments, with selection and optimization generally being a function of the ore type and desired metal value recovered.

The benefits resulting from the process of this invention, e.g., improved rate of oxidation including solubilization and/or conversion to a different form, i.e., solids, such as insoluble jarrosite, sulfates, arsenates and the like, of the metal and/or sulfur species from the metal sulfide, and/or yield/recovery of desired metal as a function of time, are substantial. Without wishing to limit the invention to any specific theory of operation, it is believed that many of such benefits result from the promoting effect of one or more of the above metal redox couples and/or metal components in the process of this invention. The promoting effect of the presently useful redox couples and metal components allows the process to be effective, e.g., from the standpoint of improved recovery of desired metal as a function of time, on a wide variety of difficult to process ores.

Improved yields or recoveries of metal are often achieved under less severe conditions by practicing the present process. The present process is relatively easy to operate and control. Relatively low concentrations of promoters are used and relatively mild operating conditions may be employed.

DETAILED DESCRIPTION OF THE INVENTION

The present process provides substantial advantages. For example, the use of at least one of certain promoting metal redox couples and promoting metal components, such as one or more iron components, vanadium components, copper components, cobalt components and manganese components (with or without complexing agents), provides for improved contacting, e.g., to increase the rate of metal and/or sulfide oxidation and ultimately to improve the yield of metal or metals recovered. The improved rate of metal and/or sulfide oxidation also results in significant process and cost economies. In addition, effective metal recoveries can be achieved utilizing low grade (heretofore difficult to process) reducible manganese-containing ores, and relatively inexpensive, plentiful metal sulfide-containing ores. Further, the present process does not require the addition of sulfur dioxide or hydrogen sulfide to maintain or culture any bacteria.

The process of this invention is useful on any suitable recoverable metal, reducible manganese-containing ore, e.g., an ore containing oxidized manganese. At least a portion of the manganese included in this ore should be chemically reducible in the present contacting step. Typical examples of such ores are psilomelane, pyrolusite, manganite, birnessite and manganese-bearing minerals from the spinel group. Particularly, the process is useful on silver, manganese-containing ores in which at least a portion of the silver is locked by the manganese-bearing minerals such that at least a portion of the silver is not readily recovered using conventional techniques, e.g., cyanide extraction. Such silver, manganese-containing ores are "preconditioned' in the present contacting step so that at least a portion, preferably a major portion, of the silver is liberated from the ore. By "liberated from the ore" is meant that the desired metal in the ore after the present contacting can be more effectively recovered using conventional (preferably cyanide extraction) processing relative to the uncontacted ore. In certain embodiments of the process of this invention, a metal sulfide-containing material is contacted with the manganese-containing ore. The metal sulfide component which is used with the reducible manganese-containing ore in this invention may be any metallic sulfide ore, including, for example, Fe, Mo, As, Cu, Ni, Sn, Sb, Bi, Zn, Co, and mixtures thereof. The metal sulfide may be in any size or form. The metal sulfide component may be intermixed with the manganese-containing ore or brought in contact with the manganese-containing ore by an aqueous composition which is, in turn, intermixed with the manganese-containing ore. Metal sulfide components useful in this invention may include other minerals or compounds in amounts which do not substantially interfere or deleteriously affect the present process. In one embodiment, the metal sulfide has a formula of $(Me)ySx$ wherein $x$ and $y$ are greater than zero, preferably $x$ is greater than $y$, and $Me$ is a metal selected from the group consisting of Fe, Mo, As, Cu, Ni, Sn, Sb, Bi, Pb, Zn, and mixtures thereof. Such metal sulfides preferably include at least one S-S (sulfur to sulfur) bond. Such sulfides include pyrites, mixed metal sulfides, iron pyrites and pyrite-like metal sulfides. Typical examples of metal sulfides and mixed metal sulfide ores are pyrite, pyrrhotite, marcasite, marionite, arsenopyrite, calcosite, chalcopyrite, covellite, bornite, sphalerite, pentlandite, millerite, cobaltite, galena, molybdenite, stannite, greenockite, argentite, stibnite, orpiment and realgar plus mixed metal sulfides. It has been found that sulfo salts, including silver sulfo salts are responsive to the process.

The recoverable metal, metal sulfide-containing ore which may be used in the process of this invention may be any suitable metallic sulfide ore. Preferably, this ore includes one or more iron sulfides, in particular iron pyrites. Metal sulfide-containing ores useful in this invention may include other minerals or compounds in amounts which do not substantially interfere or deleteriously affect the present process. The present contacting step provides for at least partially liberating the metal or metals to be recovered from the sulfide-containing ore. At least a portion, preferably a major portion of the metal to be recovered is liberated from the ore. This ore containing the desired or recoverable metal or metals, after contacting according to the present invention, is subjected to additional processing during which such metal or metals are recovered from the contacted ore.

The amount of metal sulfide employed with the reducible manganese-containing ore in the present contacting step should be sufficient to provide the chemical reduction/oxidation/metal liberation to the desired degree. Preferably, the amount of metal sulfide employed should be about 40% to about 250%, more preferably about 80% to 120%, of that required to achieve the desired degree of manganese chemical reduction. Substantial excesses of metal sulfides should be avoided since such excesses may result in materials separation and handling problems, and may even result in reduced recovery of the desired metal or metals. The amount of reducible manganese employed with the metal sulfide-containing ore in the present contacting step should be sufficient to provide the chemical reduction/oxidation/metal liberation to the desired degree. In such embodiments, the amount of reducible manganese employed is preferably about 40% to about 250%, more preferably about 80% to 120%, of that required to achieve the desired degree of metal and/or sulfide oxidation. Substantial excesses of reducible manganese should be avoided since such excesses may result in materials separation and handling problems, and may result in reduced recovery of the desired metal or metals. When the reducible manganese is regenerated in situ, with for example an additional oxidant such as air, from about 1 to about 50%, preferably from about 2 to about 25%, by weight of that used without in situ regeneration can be used within the above ranges.

The present process employs at least one of certain metal redox couples and/or metal components. Such metal components may include alkali and/or alkaline earth metals provided that they also contain one or more additional metals which are effective in the present invention. Such metal redox couples and/or metal components are present during the contacting step in an amount effective to at least promote the oxidation of the metal and/or sulfide portions of the metal sulfide in the ore. Thus, such metal redox couples and/or components are present in an amount effective to promote such oxidation and/or to oxidize the metal and/or sulfide portions of the metal sulfide.

The presently useful metal redox couples and metal components are preferably selected from the group consisting of iron components, copper components, cobalt components, vanadium components, manganese 3+ and/or 4+ components and mixtures thereof. More preferably, the metal redox couples and metal components are selected from the group consisting of iron components in which iron is present in an amount in the 3+ oxidation state in an amount effective to at least promote the oxidation of at least one of the metal and sulfide of the metal sulfide; copper components in which copper is present in an amount in the 2+ oxidation state effective to at least promote the oxidation of at least one of the metal and sulfide of the metal sulfide; cobalt components in which cobalt is present in an amount in the 2+ oxidation state effective to at least promote the oxidation of at least one of the metal and sulfide of the metal sulfide; vanadium components in which in which vanadium is present in the 3+, 4+ or 5+, preferably 5+, oxidation states in an amount effective to at least promote the oxidation of at least one of the metal and sulfide of the metal sulfide; manganese components in which manganese is present in the 3+ and/or 4+ oxidation state in an amount effective to at least promote the oxidation state in an amount effective to at least promote the oxidation of at least one of the metal and/or sulfide of the metal sulfide, and mixtures thereof. Any suitable metal component may be employed provided that such component is capable of at least promoting the oxidation, noted above. Particularly useful vanadium 5+ components are vanadium pentoxide, and the soluble vanadates and oxyanion derivatives thereof, and complexes of vanadium 5+ with ligands.

The copper +2 components are particularly effective when present in combination with an amount of ferric ion. In this embodiment, the copper +2 component acts to enhance the overall oxidation of the metal and/or sulfur from the metal sulfide. If one or more vanadium and/or copper components are present in the contacting, the vanadium 5+ and/or copper 2+ concentration is preferably at least about 10 ppm., more preferably about 50 ppm. to about 1.0% and still more preferably about 100 ppm. to about 0.1% or to about 0.5%, by weight of the aqueous composition present during the contacting, calculated as elemental vanadium and/or copper.

When vanadium 5+ and/or copper 2+ components are employed with a metal sulfide-containing ore, the reducible manganese component is preferably capable of oxidizing and maintaining an effective amount of vanadium/copper component to the vanadium 5+ and/or copper 2+ oxidation states at the contacting conditions.

In one embodiment, the iron, copper and cobalt, vanadium and manganese components are soluble and are preferably selected from iron complexes with ligands, copper complexes with ligands, cobalt complexes with ligands, vanadium components with ligands, manganese components with ligands, and mixtures thereof. Such complexes preferably include at least a portion, more preferably a major portion and still more preferably substantially all, of the metal in the preferred oxidation state, noted above.

Examples of iron complexes useful in the present invention include iron complexes with polyfunctional amines, for example, ethylenediamine, propylene diamine, ethanol amine, glycine and asparagine and salts thereof; phosphoric acids and phosphoric acid salts, for example, ethane-1-hydroxy-1, 1 -diphosphonic acid; pyridine and substituted, chelating pyridine derivatives, for example, phenanthroline, 0-phenthroline, 2, 2'-bipyridyl, glyoxime and salicylaldehyde derivatives; aquo; and CN-. Among the particularly preferred iron complexing agents for use in the present invention are those selected from the group consisting of substituted, chelating derivatives of pyridine, aquo, CN- and mixtures thereof.

Examples of copper complexes useful in the present invention are copper, in particular copper 2+, complexes with pyridine, 1, 10-phenanthroline, imidazole, substituted, non-chelating derivatives thereof and mixtures thereof. These derivatives include substituents such as hydroxy, carboxyl, amino, alkyl and aryl groups.

Cobalt, in particular cobalt 2+, complexes of chelating Schiff's bases are preferred. These ligands include, for example, ligands utilizing 1, 2 diamines, 1, 3-diamines, substituted 1, 2 dionemonoximes, substituted 1, 3-dionemonoximes, substituted salicylaldehydes and mixtures thereof, such as bis (salicylaldehyde) ethylenediamine and bis (2, 3-butandione- monoxime) ethylenediimine. Examples of vanadium and manganese complexes involving oxyonions are sulfate, nitrate, and carboxylates, e.g., acetates.

As will be recognized by those skilled in the art, the stability of the complexes formed will often be affected by the pH of the aqueous composition employed in the present contacting step. Some stability of the complex or complexes may have to be sacrificed because of the pH of the aqueous composition during the contacting, which pH may be preferred for various processing reasons. This reduced complex stability has surprisingly been found not to have an undue adverse effect on oxidation. The particular pH employed can also affect the salt form of the complexing agent employed, and such complexing salts are complexing agents within the scope of this invention.

The presently useful metal complexes are preferably not fully complexed, with for example, partial metal/ligand complexes, i.e., not fully complexed at a ratio of ligand to metal which substantially reduces the redox cycling activity of the ligand complexes. This feature, i.e., active redox cycling complexes, apparently facilitates the ability of the metal species to rapidly cycle between oxidation states and/or to promote the desired oxidation. With vanadium complexes, the mole ratio of vanadium to ligand is more preferably about 1 to about 3, still more preferably to about 2, with iron complexes the mole ratio of iron to ligand is more preferably about 1 to about 3, more preferably to about 2, and with manganese complexes the mole ratio of manganese to ligand is more preferably about 1 to about 2.0, still more preferably to about 1.5.

Any suitable ligand system may be employed. The ligands are preferably derived from the group consisting of compounds containing acetylacetonate functionality, carboxylic acid functionality (more preferably containing up to about 15 carbon atoms per molecule), poly, more preferably three, carboxylic acid functionalities, substituted carboxylic acid functionality (more preferably containing up to about 15 carbon atoms per molecule) poly, more preferably three, substituted carboxylic acid functionalities, and mixtures thereof. Particularly useful ligand systems are derived from the group consisting of compounds containing acetylacetonate functionality, citric acid functionality, tartaric acid functionality, nitrilotriacetic acid functionality, and mixtures thereof and their partial salts particularly, sodium, potassium and ammonium partial salts, and partial esters and substituted derivatives thereof. Particularly preferred species are citric acid, tartaric acid and nitrilotriacetic acid and their partial salts and esters thereof as illustrated above.

The specific amount of the metal redox couple or metal component, e.g., metal complex, employed may vary over a wide range and depends, for example, on the reducible manganese-containing ore, the metal sulfide, and/or the metal redox couple/metal component employed, and on the degree of oxidation desired.

In certain embodiments, preferred concentrations of the metal complex are in the range of about 150 to 10,000 ppm, more preferably about 200 to about 1,000 ppm., or to about 5000 ppm, by weight based upon the aqueous composition employed in the contacting, calculated as elemental metal. It is generally convenient to provide the metal complex in combination with, preferably in solution in, the aqueous composition used in the contacting step.

The metal complex can be added to the contacting step and/or can be formed in situ prior to or in the course of the contacting.

The present contacting preferably takes place in the presence of an aqueous liquid medium or composition. The metal redox couples or metal components, which are preferably soluble in the aqueous medium, may be added to the aqueous medium prior to the contacting. Any suitable aqueous medium can be employed in the present process. The pH of the aqueous medium may be acidic, neutral or basic depending, for example, on the composition of the ore or ores being treated, the specific metal redox couple or metal component being employed, and the presence or absence of other components or entities during the contacting. Preferably, the pH of the aqueous composition is in the range of about 1 or less to about 13, e.g., about 10, or more. The pH of the aqueous medium may be adjusted or maintained, e.g., during the contacting step, for example, by adding acid and/or base.

In certain embodiments, the pH of the aqueous composition may be in the range of about 0.1, preferably about 0.5, to about 5, or in the range of about 1.5 to about 4.5, or about 3.0 and lower. In other embodiments, the pH of the aqueous composition may be in the range of about 1 or 1.5 to about 3.0 or about 1 or 1.5 to about 2.5.

In still other embodiments, the contacting preferably occurs at a slightly acidic pH, i.e., a pH no lower than about 6, or at an alkaline pH. If a vanadium complex is present, the contacting is more preferably conducted at a pH in the range of about 6 to about 13, while if an iron complex is present, the pH is more preferably about 6.5 to about 9.5. For manganese complex the pH is preferably about 7.5 to about 10.5. These more preferred pH ranges are particularly useful when it is desired to maintain the metal redox couple or metal component substantially soluble, e.g., in the aqueous medium, at the contacting conditions.

The aqueous medium comprises water, preferably a major amount of water. The medium is preferably substantially free of ions and other entities which have a substantial detrimental effect on the present process. Any suitable acid and/or base or combination of acids and/or bases may be included in, or added to, the medium to provide the desired pH. For example, hydrogen halides, preferably hydrogen chloride, sulfurous acid, sulfuric acid, metal salts which decompose (in the aqueous medium) to form such acids, alkali metal hydroxides, alkaline earth metal hydroxides, ammonium hydroxide, metal salts which decompose (in the aqueous medium) to form such bases, their corresponding carbonates, preferably sodium carbonate, mixtures thereof and the like may be employed. The quantity and composition of the aqueous medium may be selected in accordance with the requirements of any given ore to be treated and as may be found advantageous for any given mode applying the present process in practice. In carrying out the present process, one or more wetting agents and/or sulfur dispersion agents can be included in, e.g., added to, the aqueous composition (in addition to the metal redox couples or metal components) to further enhance rates and/or yields. Examples of such agents include hydrocarbon sulfonates, lignosulfonates, alkyl substituted succinic anhydrides, alcohol ethoxylates and the like.

The amount of metal redox couples or metal components employed may vary widely provided that such amount is effective to function as described herein. Such metal redox couples or metal components are preferably present during said contacting in an amount less than about 2%, more preferably in the range of about 10 ppm. to about 1% by weight, calculated as elemental metal, based on the amount of ore present and/or liquid present during contacting such as a solution used in an agitated leach or during a vat or heap leach. One of the substantial advantages of the present process is that large amounts of metal redox couples or metal components are not required although adjustments can be made depending on the metal sulfide concentration in the ore. Thus, in order to reduce costs still further while achieving benefits of the present invention, low concentrations of such materials are preferably selected. The mole ratio of complexing agent to metal ion that is used to form the promoter component may be in the range of about 0.01 to 5, for example about 0.5 to about 2.0. Preferred concentrations of metal redox couples or metal components are in the range of about 20 to 10,000 ppm, more preferably about 50 to about 1,000 ppm. or to about 5,000 ppm by weight, based upon the aqueous composition, calculated as elemental metal.

In one embodiment, the present contacting occurs in the presence of added ferric ion in an amount effective to facilitate the liberating of the metal or metals to be recovered from the ore or ores. The ferric ion may be added to the contacting step separately, e.g., as ferric sulfate and other compounds which produce the desired amount of ferric ion when combined with the present aqueous composition in the contacting step or may be generated in situ. In order to more effectively control the amount of ferric ion present and to provide improved contacting, it is preferred that the ferric ion be combined with the aqueous composition prior to the present contacting step or adjusted, e.g., while recycling the aqueous composition, during ore processing. The amount of ferric ion used in the present process is typically minor, when compared to the amount of ore or ores and metal sulfide-containing material and/or reducible manganese-containing material used, and may vary depending on many factors, for example, the composition of the ore or ores and of the metal sulfide-containing material and/or the reducible manganese-containing material and the degree of metal liberation desired. Preferably, the added ferric ion is present in an amount of at least about 10 ppm. (by weight) of the aqueous composition. More preferably, the added ferric ion is present in an amount in the range of about 0.01% to about 1.0%, or even higher, for example to about 5%, by weight of the aqueous solution.

The present contacting is preferably conducted in the presence of at least one oxidant other than the metal redox couple or metal component or the reducible manganese. The oxidant is present in an amount effective to do at least one of the following; maintain or form the metal redox couple or metal component, produce or regenerate at least a portion of the metal redox couple or metal component, and/or oxidize at least a portion of the metal and/or sulfide portions of the metal sulfide and/or reduced manganese component (to produce reducible manganese) in the ore. The oxidant or oxidants may be present during the contacting step and/or during a separate step to form and/or regenerate the metal redox couple or metal component. Any suitable oxidant capable of performing one or more of the above-noted functions may be employed. The oxidant is preferably selected from the group consisting of molecular oxygen (e.g. in the form of air, dilute or enriched air, or other mixtures with nitrogen or carbon dioxide), singlet oxygen, ozone, inorganic oxidant components containing oxygen and at least one second metal and mixtures thereof. More preferably, the oxidant is selected from the group consisting of molecular oxygen, oxidant components containing oxygen and at least second metal and mixtures thereof. Still more preferably, the oxidant is selected from the group consisting oxygen, oxidant components containing oxygen and at least one second metal and mixtures thereof. One particularly preferred system involves an oxidant component containing oxygen and containing at least one second metal, and molecular oxygen in an amount effective to maintain the oxidant component in the desired oxidized state and/or to oxidize at least a portion of the metal and/or sulfide portions of the metal sulfide and/or reduced manganese component (to produce reducible manganese) in the ore. Care should be exercised to avoid large excesses of the oxidant to as to minimize reactions that could solubilize deleterious elements, i.e., arsenic, etc. The amount of oxidant employed is preferably in the range of about 10 to about 200%, preferably about 80% to about 140% of that needed to oxidize the metal and/or sulfide portions of the metal sulfide and/or reduced manganese component (to produce reducible manganese) in the ore to allow for improved liberation of the metal to be recovered in the present process.

The reducible second metal oxidants useful in the present invention may be chosen from a wide variety of materials. The second metal or metals are preferably not the same as the metal or metals to be recovered from the ore or ores. Preferably, the second metal is a metal which forms reducible metal oxides which are reduced during the conduct of the process of this invention. Many of the transition metals have this property. Typical examples of metals which have this property include minerals and other compounds which are generally solids under the condition of the process, such as, manganese, tin, lead, bismuth, germanium, antimony, indium and certain of the rare earth metals and minerals, e.g., cerium, praseodyminium and terbium and mixtures of rare earth minerals which typically have varying ratios of lanthanum, cerium, etc. Such reducible second metal components are preferably capable of becoming at least partially reduced at the present contacting conditions to form a reduced second metal component.

The present contacting results in at least a portion of the reducible second metal component being chemically reduced to form a reduced second metal component. This reducible/reduced second metal component can exit the contacting zone and be separated from the ore or ores, in particular the contacted ore or ores, i.e., partial to substantial separation. This component can be used on a once-through basis, or may be regenerated to reducible second metal component, in situ or externally and recycled to the contacting zone. In the case of a once-through basis, it is preferred to minimize the amount of reduced second metal component exiting with the ore or ores. Such regeneration can be done by electrochemically (preferably external) oxidizing the reduced second metal component or oxidizing the reduced second metal component with molecular oxygen, in situ or external, preferably promoted for purposes of enhanced yield and rate, at ambient and/or elevated temperatures to convert the reduced second metal component to a reducible second metal component.

Manganese is a more preferred second metal. In one embodiment, the reducible manganese component includes manganese in the 4+ oxidation state. One particularly useful reducible manganese component is manganese (manganic) dioxide and its pyrolusite, manganite, birnessite and manganese-bearing minerals from the spinel group. Silver, manganese-containing ores in which at least a portion of the silver is locked by the manganese-bearing minerals are particularly useful in combination with ores containing carbonaceous material, as described herein. A second preferred embodiment is redox active manganese +3 where the manganese is complexed as above and is capable of reoxidizing one of the other metal complexes and/or metal components set forth above, such as vanadium under the process condition of pH, for example, at pH's greater than about 7. It is contemplated that the first and second reducible manganese components can be the same or different or mixtures thereof. In the above embodiment, it is preferred to have present molecular oxygen during processing. The latter system provides substantially soluble components for recovery of metal.

The amount of oxidant employed in the present invention is chosen to facilitate the desired functioning of the present contacting step. Without limiting the invention to any specific theory or mechanism of operation, it may be postulated that when oxidant is employed such oxidant acts in conjunction with the metal redox couple or metal component to oxidize at least a portion of the metal and/or sulfide of the metal sulfide in the ore and "liberate" the metal to be recovered from the ore. Although the metal redox couple or metal component may take an active part in the oxidation and liberation functioning, when oxidant is employed, such metal redox couple or metal component preferably acts as a catalyst and may be, and preferably is, used more than once in the present contacting step, e.g., is recycled to the present contacting step or is employed to contact more than one increment of the ore or ores.

The amount of oxidant employed preferably acts to facilitate the desired oxidation of at least a portion of the metal and/or sulfide of the metal sulfide and liberation of metal to be recovered from the ore. The specific amount of oxidant employed varies depending on many factors, for example, the specific ore or ores being treated, the specific metal redox couple, metal component and oxidant being employed, and the specific degree of oxidation and metal liberation desired. If a reducible second metal oxidant is used, it preferably is used in an amount in the range of about 0.1% or less to about 10% or more to about 150% by weight of the metal sulfide or deleterious carbon content of carbonaceous ore. Preferably, the amount of second metal component employed in the present contacting step should be sufficient to provide the oxidation/metal liberation to the desired degree. More preferably, the amount of second metal component employed should be about 40% to about 250%, more preferably about 80% to 120%, of that required to achieve the desired degree of metal and/or sulfide and/or carbon oxidation. Substantial excesses of second metal component should be avoided since such excesses may result in materials separation and handling problems, and may result in reduced recovery of the desired metal or metals.

Although one or more of the oxidants may be utilized in a separate oxidation or regeneration step, it is preferred that such oxidants, and in particular reducible second metal components, be present and effective during the contacting step of the present invention.

In one embodiment, the present contacting occurs in the presence of at least one species of Thiobacillus bacteria in an amount effective to facilitate the liberating of the metal or metals to be recovered from the ore or ores. Since, in certain embodiments, the contacting preferably results in at least a portion of the manganese in the reducible manganese-containing ore or reducible manganese-containing material being dissolved in the aqueous composition and since the bacteria is preferably present in an acidic composition, the bacteria are preferably tolerant (remain active) in such manganese-containing compositions. The aqueous compositions and the bacteria contained therein are maintained under regeneration conditions, i.e., at conditions conducive to the propagation of bacteria, during the contacting step.

As the contacting step progresses, the aqueous composition (the lixiviant solution) preferably becomes increasingly concentrated in dissolved manganese from the reducible manganese-containing ore or reducible manganese-containing material, in the form of manganese sulfate if sulfuric acid is employed. Above certain high concentrations of manganese, the buildup of manganese will in turn reduce the activity of the Thiobacillus bacteria. In practice, the contacting step is controlled, particularly through its initial stage, to produce effective quantities of adequately manganese tolerant bacteria, for example and preferably, by controlling the ratio of reducible manganese-containing ore or ores to metal sulfide-containing material or of reducible manganese-containing material to aqueous composition and/or the bleed rate of the manganese-containing aqueous composition to insure a safe buildup rate of manganese ions in the aqueous composition. By increasing the proportion of solids to liquid, the manganese buildup rate in the aqueous composition is increased and vice versa. The manganese concentration, the total dissolved solid, and the bacterial activity in the aqueous composition can be monitored on a periodic basis as an aid to process control.

In instances where it is not practicable or desirable to exercise the required degree of control of the contacting step throughout the period of time required for developing suitably tolerant bacteria and where, consequently, it is preferred to commence the contacting step with an adequate supply of suitably tolerant bacteria, cultures of such bacteria may be prepared by known methods. Normally, the Thiobacillus bacteria can tolerate manganese in concentrations as high as 2.5 weight percent. In concentrations above 2.5 weight percent, the growth of the bacteria is slowed to a point at which bacteria become inactive. However, the bacteria can be and preferably are acclimated to higher concentrations of manganese ion by slowly increasing the manganese ion concentration level in the aqueous, acidic composition. By normal acclimation techniques, the manganese tolerance of the bacteria can be increased to greater than about 4 weight percent. The bacteria are preferably acclimated as much as is possible and cost effective. Alternately, Thiobacillus bacteria may be acclimated to higher manganese levels using chemostate techniques operating in a continuous mode.

Sources of the Thiobacillus bacteria useful in this invention include sources such as the American Type Culture Center and bacteria found to be naturally occurring in ore bodies. Of the *Thiobacillus ferrooxidans* bacteria available from the American Type Culture Center, cultures ATCC-14119, ATCC-19859, ATCC-21834, and ATCC-33020 have been used in the process of this invention. All of these cultures have been found to be satisfactory.

The pH necessary for the bacterial action may preferably be as low as about 1.5 and as high as about 4.5 for the *Thiobacillus ferrooxidans* bacteria. However, if the bacteria are acclimated to a lower pH, the pH of the aqueous composition in the present contacting step may be adjusted accordingly. Both the temperature extremes and the preferred temperature ranges may be adjusted if the bacteria are acclimated to different ranges.

The bacteria are typically cultivated with nitrogen, phosphorous and sulfate, or utilize naturally occurring nutrients. Any suitable combination of compounds or components containing these constituents may be used to culture the bacteria. Suitable compounds include ammonia, ammonium sulfate, ammonium phosphate, alkali and acid phosphates, mixtures thereof and the like. Preferably, magnesium is also included in the culturing compounds or components and suitable magnesium content may be provided by adding magnesium sulfate.

In utilizing the process of this invention, certain precautions should preferably be taken to improve performance. For example, the raw materials and equipment utilized throughout the processing circuit should normally be such as will not release or act as bactericides under the conditions prevailing during the process. Minerals which may be harmful to the bacteria include the elements cobalt, zinc, nickel, copper, mercury, and molybdenum. Concentrations of these minerals found in pyrites normally do not exceed levels which would be harmful to the bacteria. Element concentrations which would be harmful to the bacteria are illustrated in *Zeitzchriferology Microbiology*, 12/72, 310. However, as with the manganese, these concentrations may be exceeded by the use of bacteria which have been acclimated to the harmful mineral.

The contacting of the present invention takes place at a temperature and pressure and for a time sufficient to obtain the desired results. A combination of temperature and pressure effective to maintain water (the aqueous medium) in the liquid state is preferred. In one embodiment, temperatures of about 20° to about 140° C. with temperatures in the range of about 20° C. to about 110° C. and in particular between about 25° C. to about 80° C. being especially useful. Contacting pressure may be in the range of about atmospheric to about 500 psia or more. Pressures in the range of atmospheric to about 100 psia have been found to provide satisfactory results.

Contacting times vary widely depending, for example, on the mode in which the contacting is performed. Such contacting time may range from minutes to weeks or even months. For example, if the contacting occurs in a stirred tank with the ore or ores present in a slurry with the aqueous medium and the metal redox couple or metal component, the contacting time preferably is in the range of about 0.1 hours to about 60 hours, more preferably about 1 hour to about 24 hours. On the other hand, if the contacting takes place with the ore or ores placed in a heap with the aqueous medium and metal redox couple or metal component being made to flow through the heap, the contacting time is preferably in the range of about 1 day to about 6 months, more preferably about 7 days to about 60 days.

The present process may be conducted on a batch or continuous basis. The present contacting step may be conducted on a pad, with the ore or ores to be treated situated in a heap; or in a vat, tank or other suitable arrangement. The primary criterion for the contacting step is that the desired manganese chemical reduction/metal and/or sulfide oxidation (solubilization) and metal liberation take place. Preferably, the metal, manganese-containing ore and metal sulfide-containing material and/or the metal, metal sulfide-containing ore and reducible manganese-containing material and the oxidant and the metal redox couple or metal component are brought together to form an intimate admixture generally with the aqueous composition. The ore or ores are preferably subjected to particle size reduction, e.g., by crushing, grinding, milling and the like, prior to contacting to render the ore or ores more easily and/or effectively processed in the present contacting step. Air or other gaseous oxidant may be dispersed through, or otherwise contacted with, this admixture during the contacting step to achieve the desired result. Amounts of acid and/or base and/or ferric ion can be added to the initial admixture and/or may be added during the contacting to provide the desired pH and ferric ion concentration.

The pH of the aqueous liquid medium may be adjusted or maintained during the contacting step, for example, by adding one or more basic components to the aqueous liquid medium. Any suitable basic component or combination of such components may be included in, or added to, this medium to provide the desired basicity. For example, basic alkali metal and alkaline earth metal components, e.g., hydroxides, silicates, carbonates and bicarbonates, mixtures thereof and the like may be employed. Because of cost, availability and performance considerations, calcium hydroxide, sodium hydroxide, sodium carbonate, and mixtures thereof are preferred.

If bacteria are employed, it is preferred that this intimate admixture also include the bacteria. If bacteria are utilized, the aqueous composition preferably includes one or more nutrients useful by the bacteria. One or more of these nutrients may be included with one or more of the ores, sulfide material, reducible manganese-containing material, intimate admixture and aqueous composition.

The solid ore/material remaining after the contacting step may be subjected to any suitable metal recovery processing step or steps for the recovery of the metal, e.g., silver, gold, the platinum group metals and the like. For example, this solid ore/material may be neutralized with any suitable acidic or basic material, such as sulfuric acid, carbonates, bicarbonates white lime or milk of lime, and then subjected to a conventional sodium cyanide extraction, followed by activated carbon treatment and zinc dust precipitation. Alternately, the solid ore/material after contacting can be neutralized and subjected to an ammonium thiosulfate or an acid thiourea extraction followed by zinc dust precipitation. Still further, the solid ore/material after contacting can be subjected to a brine extraction followed by ion exchange to recover the desired metal or metals. The conditions at which these various recovery processing steps take place are conventional and well known in the art, and therefore are not described in detail here. However, it is important to note that conducting the metal recovery processing on the ore/material after the contacting of the present invention provides improved metal recovery performance relative to conducting the same metal recovery processing without this contacting.

In a further embodiment of this invention the contacting step and metal, e.g., silver, gold, platinum group metals and the like, recovery step can be practiced at the same time in the same processing system, i.e., agitated, vat or heap. The pH of both systems should be similar to avoid any deleterious side reactions e.g., destruction of the cyanide solution or thiourea. For example, the metal redox couples and metal components which are effective at higher pH's, e.g., about 7 to about 13, can be used in the presence of cyanide leaching solution to provide both liberation and recovery of metals in the same system. Particularly preferred metal complexes are the soluble redox active complexes of vanadium, iron, manganese and mixtures thereof, in particular those complexes wherein the ligands are derived from compounds having polycarboxylic acid functionalities and substituted polycarboxylic acid functionalities and the preferred ranges, substituents and species as set forth above.

One processing arrangement which provides outstanding results involves the agglomeration of, for example, the metal, manganese-containing ore and the metal sulfide-containing material and/or the metal, metal sulfide-containing ore and the reducible manganese-containing material. The ore, ores and/or materials are preferably subjected to crushing, grinding, or the like processing to reduce particle size to that desired optimum metallurgical liberation, generally a maximum particle diameter of about ¼ inch or less. The solid particles are mixed with sufficient aqueous liquid and if desired, promoter and bacteria. This intimate admixture is formed into agglomerates by conventional processing, such as agglomeration, extruding, pilling, tableting and the like.

The agglomerates are placed on a pad, to form a heap which is built up by addition of agglomerates, preferably over a period of time in the range of about 15 days to about 60 days. During the time the heap is being built up, and preferably for a period of time ranging up to about 3 months, more preferably about 2 months to about 3 months after the last agglomerates are added to the heap, an aqueous composition containing the metal redox couple and/or component and preferably adjusted for pH, ferric ion and/or the presence of air, is made to flow through the heap, e.g., from the top to the bottom of the heap. If bacteria are used, the aqueous composition includes one or more nutrients for the bacteria. After contacting the heap, the aqueous composition is collected and processed for disposal; or processed for manganese, second metal and/or metal redox couple and/or metal component metal recovery, regeneration and/or recycling to the heap. This contacting provides another important benefit in that at least a portion of the "cyanacides," such as copper, which may be present in the ore and/or metal sulfide-containing material is removed and/or deactivated. Such "cyanacides" cause substantial increases in cyanide consumption if present in cyanide extraction processing. Therefore, removing and/or deactivating cyanacides in the present contacting step provides for more effective metals recovery by cyanide extraction.

After the heap-aqueous composition contacting has proceeded to the desired extent, an aqueous basic (e.g., white lime, milk of lime or the like basic components) composition is contacted with the heap to neutralize the heap if a pH below 7 was used. After this neutralization, the agglomerates may be placed on a second heap, which is preferably larger than the heap previously described.

In addition, the neutralized agglomerates may be broken apart and reagglomerated prior to being placed on the second heap to provide for any incidental neutralization and/or to expose the treated ore for subsequent cyanidation. This can be done using conventional means, such as subjecting the agglomerates to grinding, milling or the like processing, and then forming the second agglomerates by agglomeration, extruding, tableting, pilling, pelletizing or the like processing.

In any event, if a second, preferably larger, heap is formed on a pad, or if one heap is used, then a dilute aqueous cyanide, preferably sodium cyanide, solution is made to contact the heap. Typically, this cyanide contacting is performed in the presence of air. Preferably, the cyanide solution is percolated through the heap. The cyanide solution, after being contacted with the heap, contains the metal or metals to be recovered. This solution is collected and sent to conventional further processing for recovery of the metal or metals.

Both heaps are preferably maintained at ambient conditions e.g., of temperature and pressure. Also, both heaps may be built up and worked (contacted) with the aqueous composition and the cyanide solution for as long as the economics of the particular application involved remain favorable.

When an agitated leach in vessels is used for the process, contact times may vary depending, for example, on the specific ore or ores being contacted, the other components present during the contacting and the degree of metal recovery desired. Contact times in the range of about 5 minutes or less to about 48 hours or more may be used. Preferably, the contact time is in the range of about 4 hours to about 36 hours, more preferably about 8 hours to about 24 hours. During this time, agitation can be advantageously employed to enhance contacting. Known mechanical mixers can be employed.

The following non-limiting examples illustrate certain of the advantages of the present invention.

EXAMPLES 1 TO 3

A quantity of a refractory sulfide ore was selected for bench scale testing. Each experiment employed 200 grams of ore, and 570 grams of an aqueous fraction. Each of the systems was agitated by a propeller stirrer in a glass container fitted with air sparging and suspended in a water bath maintained at 50° C. The conditions and results of each of these experiments are summarized as follows;

EXAMPLE 1

Conditions: The aqueous fraction included 0.5% by weight of vanadium, as vanadium citrate (1.0 mole citrate, per mole vanadium); 570 grams of pH 6 aqueous fraction; 27 grams of manganese oxide; 8% sodium chloride; 200 grams ore. Forty-eight hours stirring with air was used. The ore was analyzed at 1.8 wt % iron, 1.2 wt % sulfur 0.83% carbon and at a gold content of 0.24 ounces per ton. The gold recovery by conventional cyanidation was 30%.

Results: The ore after processing was subjected to cyanidation in the same manner as the untreated ore and a gold recovery of 89% was achieved. In addition to determining gold recovery, a qualitative measure of the responsiveness of the ore was done by treating the ore with a hydrochloric acid solution. The treatment was undertaken by stirring 10 grams of the ore sample in 100 ml. of 37 wt % hydrochloric acid at 50° C. for 15 minutes. The total dissolved iron for the untreated ore was 0.7 grams per 200 grams of ore as compared to 3 grams of iron for 200 grams of the treated ore.

EXAMPLE 2

Conditions: The same as Example 1 except the ligand was nitrilotriacetic acid, 2 grams manganese oxide was used, the pH was 12, the aqueous solution included 0.002 mole Co2+ and the run time was 24 hours.

Results: Under these conditions, a 94.2% gold recovery was obtained and 2.4 grams of iron per 200 grams of ore was dissolved in the qualitative iron test.

EXAMPLE 3

Conditions: The same as Example 2 except the ligand was citrate at a mole ratio of citrate to vanadium of 3 to 1.

Results: Under these conditions, a 93.6% gold recovery was obtained and 2.6 grams of iron per 200 grams of ore was dissolved in the qualitative iron test.

These examples show the effectiveness of combination of metal, particularly vanadium, complexed with ligands and an oxygen transfer agent such as manganese oxide. These examples also show the cyclic redox activity of the metal/ligand catalysts is effective to provide for substrate oxidation and a process which produces enhanced gold recovery.

While the present invention has been described with respect to various specific examples and embodiments, it is to be understood that the present invention is not limited thereto and that it can be variously practiced within the scope of the following claims.

What is claimed is:

1. A process for recovering at least one first metal selected from the group consisting of gold, silver, the platinum group metals and mixtures thereof from an ore containing said first metal and at least one metal sulfide comprising contacting said ore with at least one metal component effective for the oxidation of said metal sulfide and at least one oxidant effective to cycle said metal component to an oxidized state, said contacting occurring in the presence of an aqueous medium at a pH in the range of from about 6 to alkaline and at conditions including an aqueous soluble amount of the metal component effective to (1) chemically oxidize said metal sulfide, (2) liberate said first metal from said ore, and (3) cycle said metal component to an oxidized state, said metal component being selected from the group consisting of iron (3+) complexes with at least one ligand, vanadium (5+) complexes with at least one ligand, manganese complexes with at least one ligand and mixtures thereof wherein said ligand contains at least one functional group group consisting of ketone, carboxylic acid hydroxy and mixtures thereof; and recovering said first metal from said ore.

2. The process of claim 1 wherein ligand contains two or more functional groups selected from the group consisting of ketone, carboxylic acid, substituted carboxylic acid, hydroxy and mixtures thereof.

3. The process of claim 1 wherein ligand contains a substituted carboxylic acid functional group.

4. The process of claim 3 wherein the ligands containing a carboxylic acid functional group, a substituted carboxylic acid functional group, two or more carboxylic acid functional groups and two or more substituted carboxylic acid functional groups, contain up to about 15 carbon atoms per molecule.

5. The process of claim 3 wherein ligand contains a functional group selected from the group consisting of acetylacetonate, citric acid, tartaric acid, nitrilotriacetic acid and mixtures thereof.

6. The process of claim wherein said vanadium (5+) complex has a mol ratio of vanadium to ligand in the range of about 1 to about 3; said iron (3+) complex has a mol ratio of iron to ligand in the range of about 1 to about 3; and said manganese (3+ or 4+) complex has a mol ratio of manganese to ligand in the range of about 1 to about 2.0.

7. The process of claim 3 wherein said vanadium (5+) complex has a mol ratio of vanadium to ligand in the range of about 1 to about 3; said iron (3+) complex has a mol ratio of iron to ligand in the range of about 1 to about 3; and said manganese (3+ or 4+) complex has a mol ratio of manganese to ligand in the range of about 1 to about 2.0.

8. The process of claim 1 wherein said metal component is at least one of said vanadium (5+) complexes with at least one ligand and said contacting occurs at a pH in the range of about 6 to about 13.

9. The process of claim 2 wherein said metal component is at least one of said vanadium (5+) complexes with at least one ligand and said contacting occurs at a pH in the range of about 6 to about 13.

10. The process of claim 3 wherein said metal component is at least one of said vanadium (5+) complexes with at least one ligand and said contacting occurs at a pH in the range of about 6 to about 13.

11. The process of claim 5 wherein said metal component is at least one of said vanadium (5+) complexes with at least one ligand and said contacting occurs at a pH in the range of about 6 to about 13.

12. The process of claim 1 wherein said metal component is at least one of said iron (3+) complexes with at least one ligand and said contacting occurs at a pH in the range of about 6.5 to about 9.5.

13. The process of claim wherein said metal component is at least one of said manganese (3+ or 4+) complexes with at least one ligand and said contacting occurs at a pH in the range of about 7.5 to about 10.5.

14. The process of claim 1 wherein said oxidant is selected from the group consisting of molecular oxygen, singlet oxygen, manganic oxidant components containing oxygen and at least one second metal, and mixtures thereof.

15. The process of claim 14 wherein said oxidant is manganese dioxide.

16. The process of claim 14 wherein said oxidant is molecular oxygen.

17. The process of claim 1 wherein said metal component is present in said contacting in an amount in the range of about 50 to 5,000 ppm by weight based on the weight of said aqueous medium.

18. The process of claim 4 wherein the ligand is a salt selected from the group consisting of sodium, potassium, and ammonium.

19. The process of claim 11 wherein the ligand is citric acid.

* * * * *